United States Patent [19]

Desai et al.

[11] Patent Number: 4,558,590
[45] Date of Patent: Dec. 17, 1985

[54] METHOD FOR MEASURING THE REAL CONTACT AREA IN CONNECTORS

[75] Inventors: Kishor V. Desai, Binghamton; Roupen L. Keusseyan, Endwell, both of N.Y.

[73] Assignee: International Business Machines Corporation, Armonk, N.Y.

[21] Appl. No.: 604,752

[22] Filed: Apr. 27, 1984

[51] Int. Cl.$^4$ .............................................. G01B 21/28
[52] U.S. Cl. .................................... 73/104; 73/432 R
[58] Field of Search ..................... 73/104, 105, 432 G, 73/432 R

[56] References Cited

U.S. PATENT DOCUMENTS

| | | | |
|---|---|---|---|
| 3,447,366 | 6/1969 | Villalobos | 73/104 |
| 3,755,659 | 8/1973 | Bolhuis | 73/146 X |
| 4,099,967 | 7/1978 | Schumacher et al. | 75/128 A |
| 4,247,575 | 1/1981 | O'Connel et al. | 204/151.1 R X |

FOREIGN PATENT DOCUMENTS

| | | | |
|---|---|---|---|
| 161356 | 12/1979 | Japan | 73/104 |
| 87448 | 5/1983 | Japan | 73/104 |
| 2056059 | 3/1981 | United Kingdom | 73/104 |
| 2088782 | 6/1982 | United Kingdom | 73/104 |
| 637640 | 12/1978 | U.S.S.R. | 73/104 |
| 868463 | 9/1981 | U.S.S.R. | 73/104 |

OTHER PUBLICATIONS

"Replica Method for Examining Surface Profiles"; *The Review of Scientific Instruments;* vol. 30, No. 6; Jun. 1959; pp. 444–446; A. P. Young et al.
"Digital Model of Switching Element Contact Surface", J. Francyk, Institute of Telecommunication and Acoustics Technical University of Wroclaw, pp. 555–559.
"The Microworld of the Contact Spot", J. B. P. Williamson, Williamson Interface, Malvern Worcestershire, England, pp. 1–10.

*Primary Examiner*—Stewart J. Levy
*Assistant Examiner*—Tom Noland
*Attorney, Agent, or Firm*—John H. Bouchard

[57] ABSTRACT

A method to measure the real contact surface area of a connector or pin is disclosed. The pin and the connector is Gold plated. The pin or the connector is coated with platinum. The pin surface and the connector surface actually comprise a multitude of peaks and valleys, termed asperites. If the pin is chosen to be coated with the platinum, the platinum coated pin is mated with a connector. A portion of the pin surface contacts a corresponding portion of the connector surface. The portion of the pin surface and the corresponding portion of the connector surface is termed a real contact surface area. The pin and connector are separated. The platinum formerly adhering to the real contact surface area of the pin is removed and adheres to the real contact surface of the gold plated connector. Using a metallograph or a scanning electron microscope, the real contact surface of the connector or pin is studied and observed. Since the visual image of platinum is substantially different than the visual image of Gold, the real contact surface area of the pin (and of the connector) is readily discernable. Using an image analyzer, the real contact surface area on the pin and on the connector is measured.

14 Claims, 5 Drawing Figures

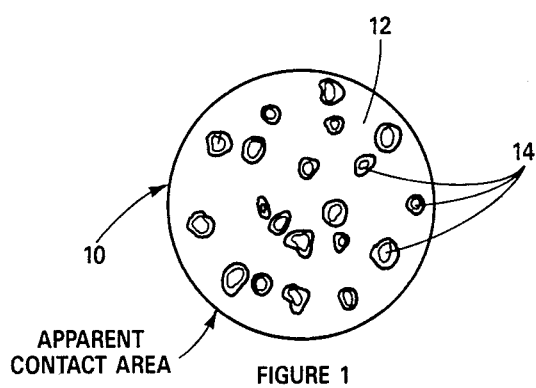
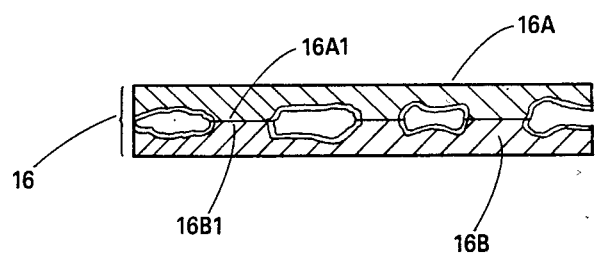

METHOD FOR MEASURING THE REAL CONTACT AREA IN CONNECTORS

BACKGROUND OF THE INVENTION

1. Field of the Invention

The present invention pertains to connectors utilized in printed circuit board packaging, and more particularly, to a method for measuring the real contact area in connectors.

2. Description of the Prior Art

When a pin is intended to mate with a receptacle or a connector in the same manner that an electrical plug mates with its female receptacle, the apparent area of contact of the pin vis-a-vis the receptacle is different than the actual, real area of contact of the pin vis-a-vis the receptacle. The surface of the pin comprises a multitude of peaks and valleys (otherwise termed asperites). In addition, the surface of the receptacle or connector also comprises a multitude of peaks and valleys. When the pin mates with its receptacle or connector, a portion of the surface of the pin mates with a corresponding portion of the surface of its receptacle or connector. The portion of the surface of the pin which mates with the corresponding portion of its receptacle is usually less than the total surface area of the pin. For example, the surface of the peaks associated with one contact area (e.g. the pin) may contact or mate with the surface of the peaks associated with the other contact area (the connector). Therefore, the total surface area of the portion of the surface of the pin which contacts or mates with the corresponding portion of the surface of its receptacle corresponds to the actual, real area of contact whereas the total surface area of the pin corresponds to the apparent area of contact. In the example, the total surface area of the peaks of the one contact area corresponds to the actual, real area of contact whereas the total surface area of the peaks and the valleys corresponds to the apparent area of contact. In connector technology, a determination of the real contact area is important in a subsequent determination of the surface resistance of the pin vis-a-vis its receptacle.

In the field of printed circuit board packaging technology, a chip is mounted on a substrate, and the substrate is connected to a printed circuit board via a pin and a female connector receptacle. As a result of a need for an increase in the performance of computing systems, the number of circuits on the chip and the number of chips has increased. An increase in the number of circuits on the chip necessitates an increase in the number of pins on the substrate to power and provide a signal to the additional circuits on the chip. However, if the pin-to-connector surface resistance is too high, the signal current and the power current energizing the circuits on the chip will encounter an undesirable delay during its attempt to traverse the connector-to-pin interface. This delay results in a decrease in the performance of the circuits on the chips. Therefore, an accurate method for measuring the real contact surface area of the pin surface and the real contact surface area of the connector surface is very important in determining the surface resistance of the pin and the surface resistance of the connector and in further determining the expected performance of the circuits on the chips.

In the prior art, one method of measuring the real contact surface area was to mate two surface areas (e.g.—a pin and a connector) and to inject a corrosive gas into the interface region between the two surface areas. The gas would attack and corrode the valleys but would not corrode the peaks associated with each surface area. The surface area associated with the non-corroded peaks could be measured. However, a corrosive gas does not react with a noble metal, such as Gold.

Another prior art method of measuring the real contact surface area in connectors was to mate the two surface areas of the connector and to expose the two surface areas to a high voltage pulse. The high pulse would melt the areas of the connector which were in contact with one another. The surface area associated with the melted regions could be measured. However, the real contact surface area of a connector contact surface is changed due to the melting of the areas of the connector (the peaks) which are in contact with one another.

Still another prior art method is the so-called "metal on glass" technique. In this method, a connector contact surface is pressed against the surface of glass. The real contact surface area may be visually seen and therefore measured through the glass. However, the real contact surface area is changed when the connector contact surface is pressed against the glass. Furthermore, the measurement of the real contact surface area is dependant upon the specific properties of the glass.

Therefore, each of the above three prior art techniques are subject to error which results in an erroneous determination of the real contact surface area of a connector contact surface.

SUMMARY OF THE INVENTION

Accordingly, it is a primary object of the present invention to provide an improved method for measuring the real contact surface area of a contact surface.

It is another object of the present invention to provide an improved method for measuring the real contact surface area of a contact surface by coating a contact surface with a metallic material which is different than the metallic material constituting the contact surface, mating the coated contact surface with another associated contact surface, separating the two contact surfaces, and examining each of the contact surfaces utilizing metallographic or electron microscopic techniques. The regions of the coated contact surface which mate (or come into contact) with the corresponding regions of the other contact surface are easily distinguishable from the remaining regions of the coated contact surface due a visual contrast existing between the two regions which is apparent due to the different metallic coatings in each region.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from a reading of the detailed description given hereinbelow and the accompanying drawings, which are given by way of illustration only, and thus are not limitative of the present invention, and wherein:

FIG. 1 illustrates a top view of a connector contact surface including the peaks and valleys on the surface;

FIG. 2 illustrates cross-sectional side view of two connector contact surfaces in contact with one another, the peak and valley regions being particularly noticeable;

DETAILED DESCRIPTION OF THE PREFERRED EMBODIMENT

Figure 3:
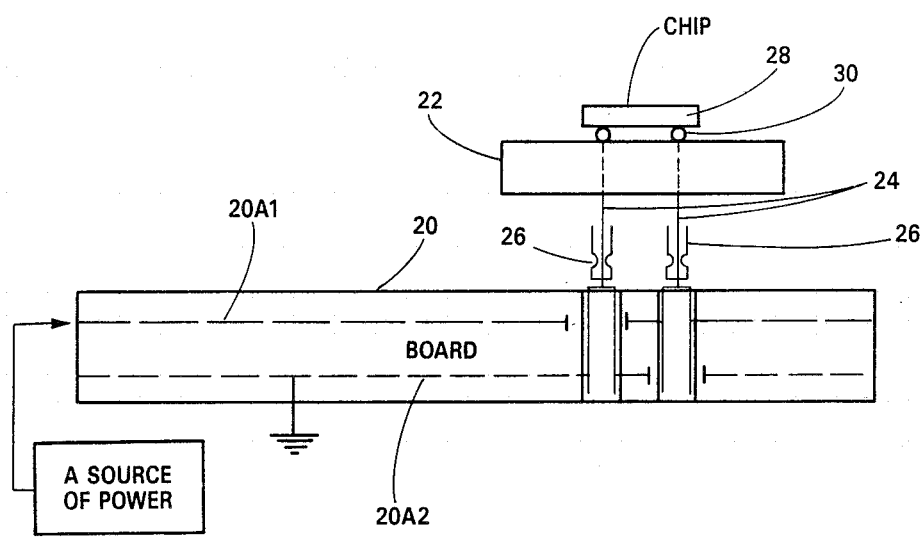
FIG. 3 illustrates a printed circuit board, a substrate connected thereto via a pin and a female receptacle, and an integrated circuit chip mounted on the top of the substrate.

Referring to FIG. 1, a top view of a contact surface 10 is illustrated. In FIG. 1, the contact surface 10 includes a multitude of asperites, that is, peaks 12 and valleys 14. The entire surface 10 may be termed an apparent contact surface. However, a portion of the surface 10 may be termed a real contact surface. For example, if the peaks 12 and not the valleys 14 of one contact surface mates with another contact surface, the total surface area of all of the peaks 12 constitutes the real contact surface.

Referring to FIG. 2, a side view of two contact surfaces 16 is illustrated, the two contact surfaces being in contact with one another. In FIG. 2, the two contact surfaces 16 include a top surface 16a and a bottom surface 16b. The top surface 16a includes a multitude of peaks and valleys, and the bottom surface 16b also includes a multitude of peaks and valleys. In the example illustrated in FIG. 2, the peaks of top surface 16a are in contact with the peaks of bottom surface 16b; none of the peaks of the top surface 16a are in contact with the valleys of the bottom surface 16b and vice-versa. For example, peak 16a1 of top surface 16a is in contact with peak 16b1 of bottom surface 16b. Therefore, for the example illustrated in FIG. 2, the real contact surface area associated with top surface 16a and bottom surface 16b comprises the total surface area occupied by all of the peaks 16a1 and all of the peaks 16b1, respectively.

Referring to FIG. 3, a side view of a printed circuit board packaging assembly is illustrated. In FIG. 3, the printed circuit board packaging assembly comprises a printed circuit board 20, and a substrate 22 connected to the board 20 via a plurality of pins 24 and a plurality of corresponding female receptacles 26, otherwise known as Harcon connectors. An integrated circuit chip 28 is mounted on the substrate 22 via a plurality of solder balls 30. Alternatively, the chip 28 may be mounted on the substrate 22 via a wire bonding technique.

The pins 24 are connected to various distribution planes 20a1 and 20a2 within the board 20 via the Harcon connectors 26. Plane 20a1 is a power distribution plane which supplies the necessary current to chip 28 needed to power the circuits on the chip, and plane 20a2 is a ground distribution plane for providing a return path for the current to a ground potential.

The amount of power and signal current supplied to the pins 24 via the Harcon connectors 26 is a function of the surface resistance of the connector 26 and of the pin 24. The surface resistance is, in turn, a function of real contact surface area of the Harcon connector 26 and the pin 24. Since a specific amount of power and signal current is needed to power and to operate the circuits on the chip 28, if the real contact surface area of the connector 26 or the pin 24 is too low, the surface resistance of the connector 26 or the pin 24 will be too high. Therefore, the power and signal current supplied to the circuits on chip 28 via the connector 26 and pin 24 is delayed at the connector 26/pin 24 interface due to the high surface resistance. Therefore, the operational performance of the circuits on the chip 28 is impaired. Consequently, it is important to identify an accurate and reliable method for determining the real contact surface area of the connectors 26 and the pins 24.

Figure 4:
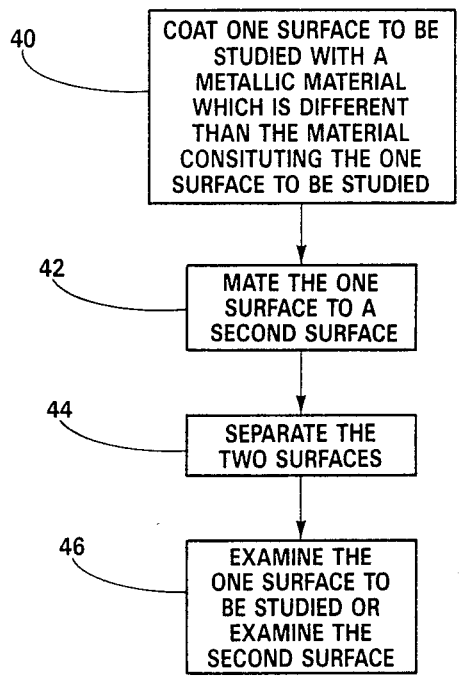
FIG. 4 illustrates a flow chart depicting the basic method steps according to the present invention for measuring the real contact surface area on a connector contact surface.

Referring to FIG. 4, a flow chart is illustrated depicting a set of method steps according to the present invention for accurately determining the real contact surface area of a connector, such as connector 26, and of a pin, such as pin 24. In FIG. 4, a first step 40 of the set of method steps comprises the coating of one surface of a pin or a connector to be studied with a metallic material which is different than the material constituting the one surface to be studied. In a second step 42, the one surface which is coated with the metallic material is mated with a second surface. In a third step 44, the two surfaces are separated from one another. In a fourth step 46, the one surface to be studied is examined using metallographic or electron microscopic techniques. Similarly, the second surface may also examined using these techniques.

In the preferred embodiment of the present invention, connectors 26 and pins 24 are gold plated. Pin 24 is intended to mate with connector 26. However, prior to mating pin 24 with connector 26, pin 24 is coated with platinum. Alternatively, connector 26 may be coated with the platinum. If it is determined that pin 24 should be coated with the platinum in lieu of connector 26, a "sputtering" technique is utilized to coat the platinum onto the gold pin 24. The pin 24 is inserted into and mated with the connector 26. A portion of the surface of pin 24 contacts a corresponding portion of the surface of connector 26. This particular portion of the surface of pin 24 is termed the real contact surface area. The pin 24 is then separated from the connector 26. When the pin 24 and connector 26 are separated, the platinum coating, which adhered to the real contact surface area of pin 24, is removed from the real contact surface area and adheres to the corresponding portion of the surface of connector 26. As a result, a gold surface appears on pin 24 in locations corresponding to its real contact surface area and a platinum surface appears on pin 24 in locations corresponding to its remaining surface area. Similarly, a platinum surface appears on connector 26 in locations corresponding to its real contact surface area and a gold surface appears on connector 26 in locations corresponding to its remaining surface area. Since platinum is a different material than gold, a visual inspection of the pin 24 or the connector 26 will reveal that the real contact surface area of pin 24 or connector 26 is distinct from its remaining surface area. Using metallographic or electron microscopic techniques, the total surface area corresponding to the real contact surface area may be observed. Once the real contact surface area of pin 24 and connector 26 is determined, its surface resistance is determined. As a result, the amount of delay associated with the current energizing the circuits on chip 28 may be determined.

The performance of the circuits on chip 28 may be predicted.

If the surface resistance of pin 24 or connector 26 is too high, one of the following corrective measures may be taken: (1) increase the connector-to-pin contact force, (2) increase the connector-to-pin total contact area by changing the geometry of the connector 26 or pin 24, (3) change the surface roughness of the pin 24 or connector 26 (a smoother surface results in a lower surface resistance), and (4) wipe the connector-to-pin interface.

Figure 5:
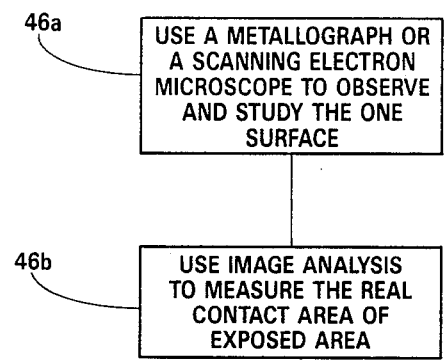
FIG. 5 illustrates a flow chart depicting a set of method steps constituting step 46 of FIG. 4.

Referring to FIG. 5, a set of method steps are illustrated which constitute step 46 of FIG. 4. In FIG. 5, the step of examining the one surface to be studied or examining the second surface, illustrated in block 46 of FIG. 4, comprises the following further steps: in step 46a, a metallograph or a scanning electron microscope is used to observe/study a surface to be examined; and in step 46b, image analysis is used to measure the real contact area of the surface to be examined. Using the steps shown in FIG. 5, the real contact surface area of a connector 26 or a pin 24 may be measured.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of measuring the true contact surface area of a contact surface, comprising the steps of:
    coating said contact surface with a metallic material which is different than the metallic material constituting said contact surface;
    mating the coated contact surface with another contact surface;
    separating said contact surface from said another contact surface; and
    examining the contact surfaces.

2. The method of claim 1 wherein said coating step further comprising the step of sputtering said metallic material onto said contact surface.

3. The method of claim 2 wherein the first mentioned contact surface comprises a gold metallic material.

4. The method of claim 3 wherein the coated on metallic material comprises platinum.

5. The method of claim 1 wherein said examining step comprises the step of observing the contact surfaces using metallographic techniques.

6. The method of claim 5 wherein said coating step further comprises the step of sputtering said metallic material onto said contact surface.

7. The method of claim 6 wherein the first mentioned contact surface comprises a gold metallic material.

8. The method of claim 7 wherein the coated on metallic material comprises platinum.

9. The method of claim 5 wherein said examining step further comprises the step of measuring the surface area of said contact surfaces using image analysis techniques.

10. The method of claim 1 wherein said examining step comprises the step of observing the contact surfaces using electron microscopic techniques.

11. The method of claim 10 wherein said coating step further comprises the step of sputtering said metallic material onto said contact surface.

12. The method of claim 11 wherein the first mentioned contact surface comprises a gold metallic material.

13. The method of claim 12 wherein the coated on metallic material comprises platinum.

14. The method of claim 10 wherein said examining step further comprises the step of measuring the surface area of said contact surfaces using image analysis techniques.

* * * * *